United States Patent
Owaki et al.

(10) Patent No.: US 12,222,490 B2
(45) Date of Patent: Feb. 11, 2025

(54) METROLOGY SYSTEM, AND APPARATUS INCLUDING PRIMARY MIRROR

(71) Applicant: Mitsubishi Electric Corporation, Tokyo (JP)

(72) Inventors: Yuto Owaki, Tokyo (JP); Atsushi Kato, Tokyo (JP); Noboru Kawaguchi, Tokyo (JP); Satoru Sofuku, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/281,568

(22) PCT Filed: Mar. 22, 2022

(86) PCT No.: PCT/JP2022/013222
§ 371 (c)(1),
(2) Date: Sep. 12, 2023

(87) PCT Pub. No.: WO2022/202823
PCT Pub. Date: Sep. 29, 2022

(65) Prior Publication Data
US 2024/0192478 A1 Jun. 13, 2024

(30) Foreign Application Priority Data
Mar. 23, 2021 (JP) .................. 2021-048500

(51) Int. Cl.
*G02B 23/00* (2006.01)
*G02B 7/182* (2021.01)
(Continued)

(52) U.S. Cl.
CPC ........... *G02B 23/02* (2013.01); *G02B 7/1821* (2013.01); *G02B 23/16* (2013.01)

(58) Field of Classification Search
CPC ........ G02B 23/00; G02B 23/02; G02B 23/06; G02B 23/16; G02B 23/165;
(Continued)

(56) References Cited

U.S. PATENT DOCUMENTS 4,475,110 A    10/1984   Hutchins
7,843,385 B2 *  11/2010   Sohfuku ................ H01Q 1/125
                                                        342/359
(Continued)

FOREIGN PATENT DOCUMENTS

JP    2005-070408 A    3/2005
JP    2007-129463 A    5/2007
(Continued)

OTHER PUBLICATIONS

Decision to Grant issued Sep. 12, 2023 in Japanese Patent Application No. 2023-509206, 3 pages.
(Continued)

*Primary Examiner* — Thong Q Nguyen
(74) *Attorney, Agent, or Firm* — XSENSUS LLP

(57) ABSTRACT

A metrology system measures an amount of displacement of a structure of apparatus including primary mirror, the apparatus including primary mirror including a primary mirror portion including a primary mirror and a primary mirror supporting portion, an elevation axis structural body supporting the primary mirror portion, and being rotatable around an elevation axis, an azimuth mount being rotatable around an azimuth axis allowing an azimuth angle in the orientation direction to be changed, and to support the elevation axis structural body, and a pedestal portion supporting the azimuth mount, and the metrology system includes an elevation axis base portion provided along the elevation axis, passing through a position where the elevation axis and the azimuth axis intersect, and being fixed to
(Continued)

the azimuth mount, and an inclinometer that is disposed at a position of the elevation axis base portion through which the azimuth axis passes and measures an inclination angle.

20 Claims, 8 Drawing Sheets

(51) Int. Cl.
*G02B 23/02* (2006.01)
*G02B 23/16* (2006.01)

(58) Field of Classification Search
CPC ...... G02B 23/2476; G02B 7/00; G02B 7/003; G02B 7/004; G02B 7/005; G02B 7/008; G02B 7/18; G02B 7/181; G02B 7/182; G02B 7/1821; G02B 7/1822; G02B 7/1824; G02B 7/1827; G02B 7/1828; G02B 7/183; G02B 7/198; G02B 7/287
USPC ................ 359/399, 405–406, 429–430, 838, 359/852–853, 871–881
See application file for complete search history.

(56) References Cited

U.S. PATENT DOCUMENTS

| | | | |
|---|---|---|---|
| 10,553,929 B2 * | 2/2020 | Patel | H01Q 1/1264 |
| 10,697,755 B1 * | 6/2020 | Peters | G01B 21/042 |
| 2005/0052736 A1 | 3/2005 | Takaki et al. | |
| 2007/0097004 A1 | 5/2007 | Sohfuku | |
| 2013/0248698 A1 | 9/2013 | Ezaki et al. | |

FOREIGN PATENT DOCUMENTS

| | | |
|---|---|---|
| JP | 2013-200235 A | 10/2013 |
| JP | 2013-243655 A | 12/2013 |

OTHER PUBLICATIONS

International Search Report and Written Opinion mailed on Jun. 14, 2022, received for PCT Application PCT/JP2022/013222, filed on Mar. 22, 2022, 9 pages including English Translation.
Notice of Reasons for Refusal mailed on May 30, 2023, received for JP Application 2023-509206, 3 pages including English Translation.

* cited by examiner

METROLOGY SYSTEM, AND APPARATUS INCLUDING PRIMARY MIRROR

CROSS-REFERENCE TO RELATED APPLICATIONS

The present application is based on PCT filing PCT/JP2022/013222, filed Mar. 22, 2022, which claims priority from Japanese Patent Application No. 2021-048500, filed Mar. 23, 2021, the entire contents of each are incorporated herein by reference.

TECHNICAL FIELD

The present disclosure relates to a metrology system that measure an amount of displacement of a structure and apparatus including primary mirror.

BACKGROUND ART

Conventional metrology systems that measure an amount of displacement of telescope apparatus include a metrology system that detects movement of right and left yoke portions of a telescope and estimates an orientation direction of a primary mirror (see, for example, PTL 1). Further, in a conventional telescope apparatus, an orientation error is predicted and corrected (see, for example, PTL 2).

On the other hand, distance sensors such as a linear encoder that measures an amount of displacement of a structure such as a telescope and measures an amount of mechanical displacement between objects in a linear direction (a moving distance of one of the objects relative to the other object) and a rotary encoder that measures an amount of mechanical displacement in a rotation direction (a rotation angle of one of the objects relative to the other object) are known (see, for example, PTL 3). Such sensors measure the amount of mechanical displacement between two objects by reading the division on a scale provided on one of the objects with a read head provided on the other object.

CITATION LIST

Patent Literature

PTL 1: Japanese Patent Laid-Open No. 2005-70408
PTL 2: Japanese Patent Laid-Open No. 2007-129463
PTL 3: Japanese Patent Laid-Open No. 2013-200235

SUMMARY OF INVENTION

Technical Problem

Such a conventional metrology system, however, has a problem that as a method for estimating an orientation direction of a primary mirror, no method has been disclosed other than a method based on detection of movement of a yoke portion of a telescope.

The present disclosure has been made to solve the above-described problem, and it is therefore an object of the present disclosure to provide a metrology system and apparatus including primary mirror capable of measuring an amount of displacement of an elevation axis.

Solution to Problem

A metrology system of the present disclosure is a metrology system for measuring an amount of displacement of a structure of apparatus including primary mirror, the apparatus including primary mirror including a primary mirror portion including a primary mirror and a primary mirror supporting portion to support the primary mirror, an elevation axis structural body to support the primary mirror portion, and being rotatable around an elevation axis that allows an elevation angle in an orientation direction in which the primary mirror is oriented to be changed, an azimuth mount being rotatable around an azimuth axis that allows an azimuth angle in the orientation direction to be changed, and to support the elevation axis structural body rotatably around the elevation axis, and a pedestal portion to support the azimuth mount rotatably around the azimuth axis, the metrology system including an elevation axis base portion provided along the elevation axis, passing through a position where the elevation axis and the azimuth axis intersect, and being fixed to the azimuth mount, and an inclinometer disposed at a position of the elevation axis base portion through which the azimuth axis passes, and to measure an inclination angle of the elevation axis base portion.

Apparatus including primary mirror of the present disclosure includes a primary mirror portion including a primary mirror and a primary mirror supporting portion to support the primary mirror, the primary mirror being a parabolic mirror that is a paraboloid of revolution, a rotation axis of the paraboloid of revolution, being in a twisted position relative to an elevation axis that allows an elevation angle in an orientation direction in which the rotation axis is oriented to be changed, an elevation axis structural body to support the primary mirror portion, and being rotatable around the elevation axis, an azimuth mount being rotatable around an azimuth axis that allows an azimuth angle in the orientation direction to be changed, and to support the elevation axis structural body rotatably around the elevation axis, a pedestal portion to support the azimuth mount rotatably around the azimuth axis, an elevation axis base portion provided along the elevation axis, passing through a position where the elevation axis and the azimuth axis intersect, and being fixed to the azimuth mount, and an inclinometer disposed at a position of the elevation axis base portion through which the azimuth axis passes, and to measure an inclination angle of the elevation axis base portion.

Advantageous Effects of Invention

According to the present disclosure, it is possible to provide the metrology system and the apparatus including primary mirror capable of measuring an amount of displacement of an elevation axis.

DESCRIPTION OF EMBODIMENTS

First Embodiment

Figure 1:
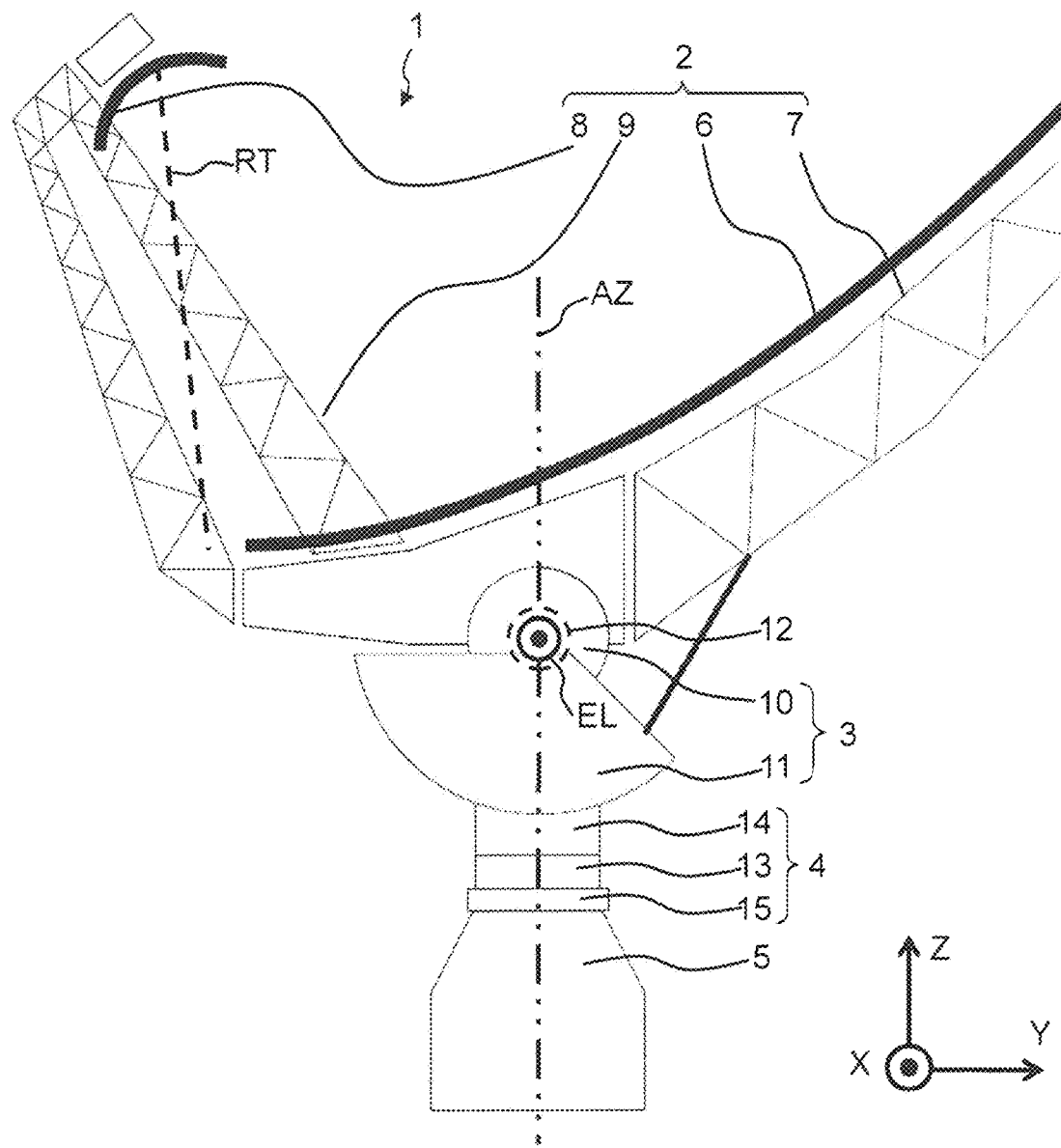
FIG. 1 is a schematic right side view of telescope apparatus according to a first embodiment.
Figure 2:
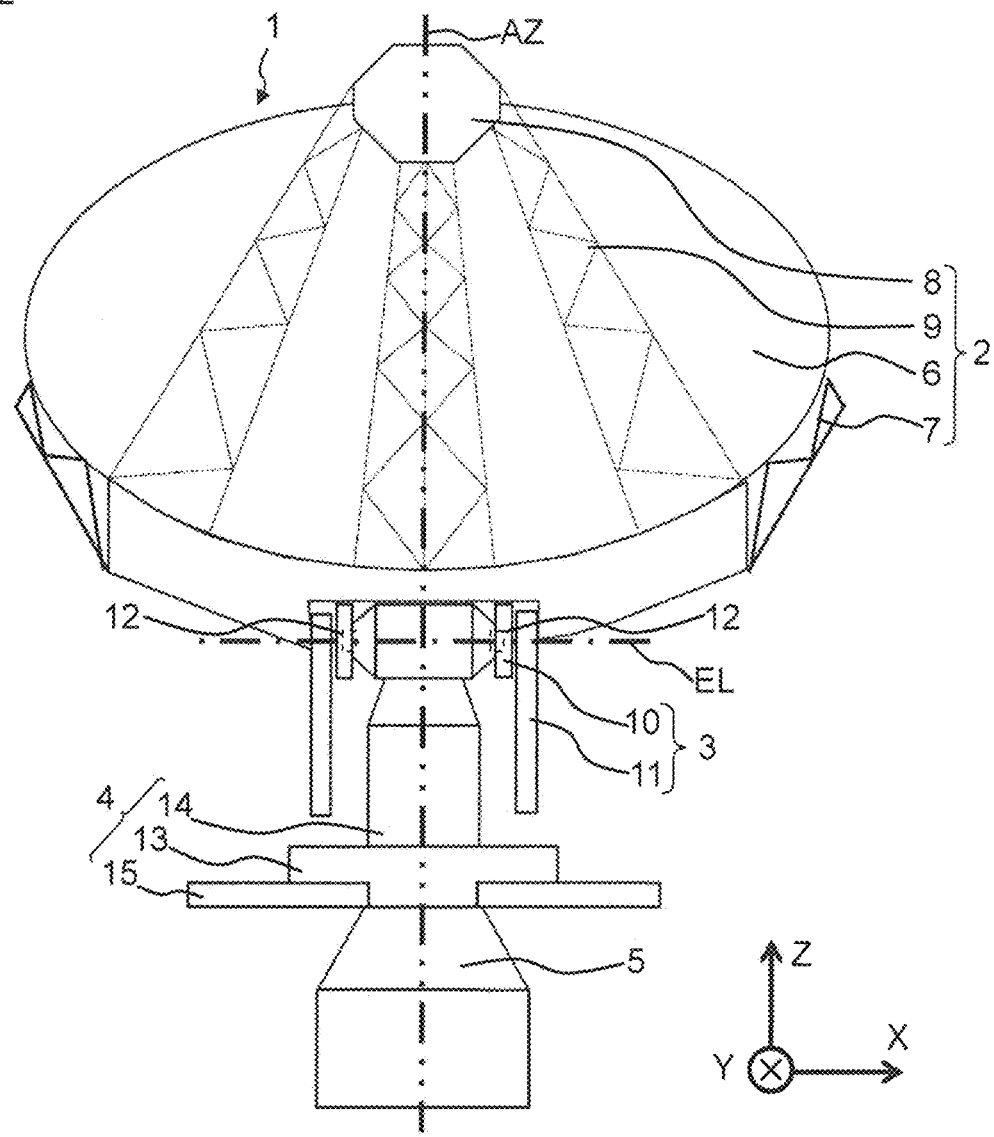
FIG. 2 is a schematic front view of the telescope apparatus according to the first embodiment.
Figure 3:
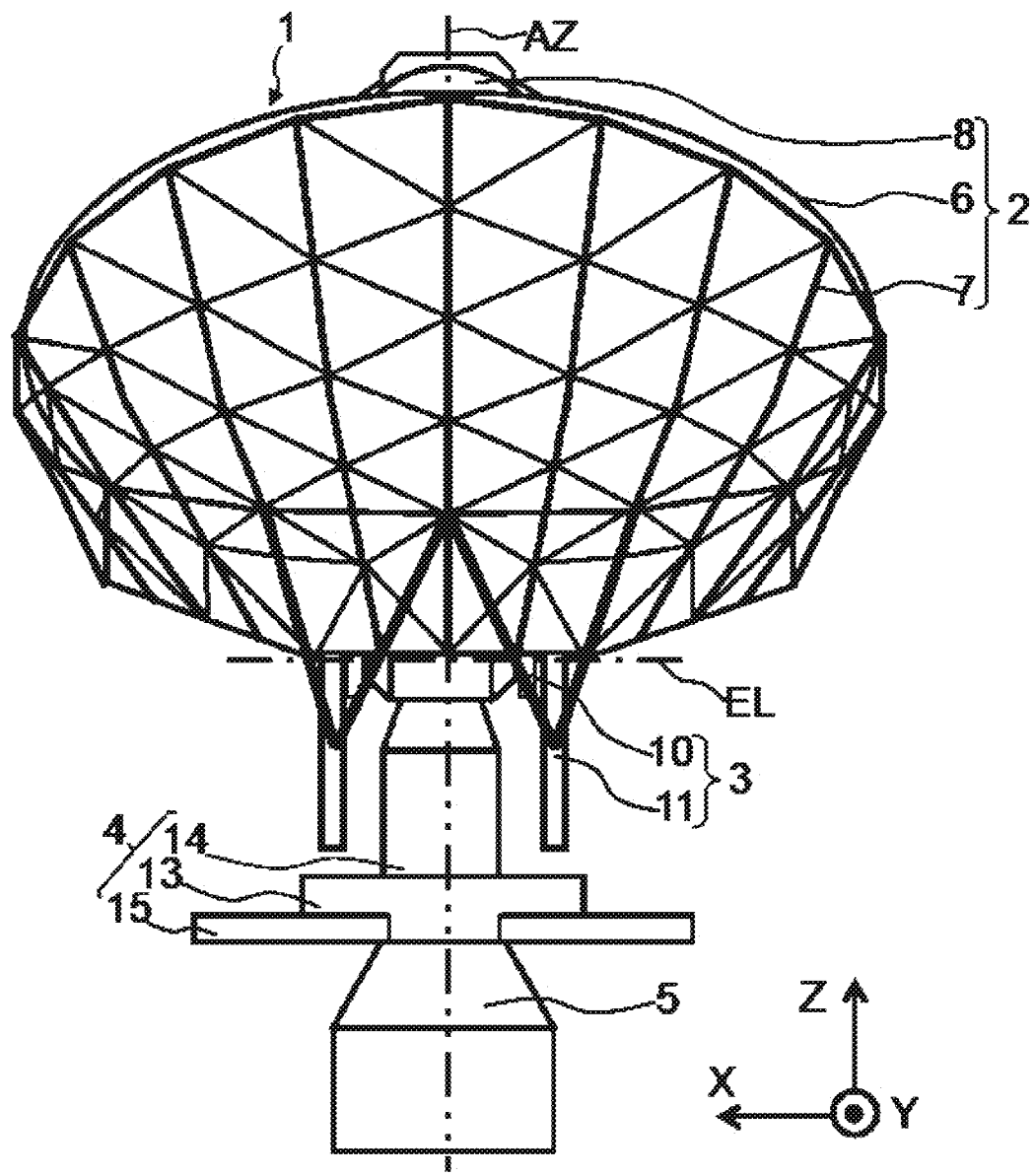
FIG. 3 is a schematic rear view of the telescope apparatus according to the first embodiment.
Figure 4:
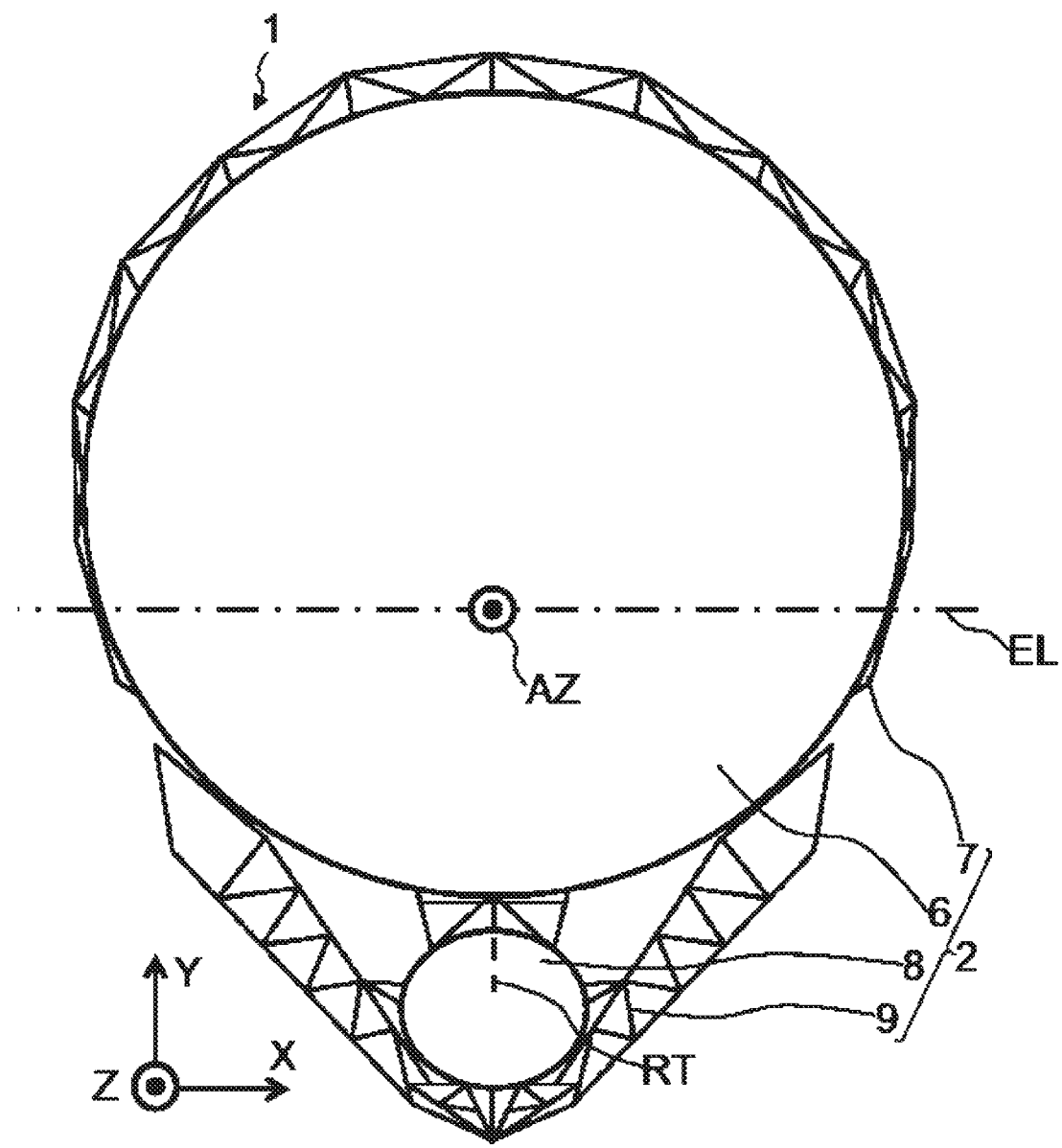
FIG. 4 is a schematic plan view of the telescope apparatus according to the first embodiment.

A metrology system and telescope apparatus according to a first embodiment are described with reference to FIGS. 1 to 6. The metrology system according to the first embodiment measures an amount of displacement of a structure of telescope apparatus 1. Telescope apparatus 1 is apparatus including primary mirror including a primary mirror that reflects light or radio waves. The metrology system according to the present disclosure is applicable to the apparatus including primary mirror including a primary mirror that reflects light or radio waves, such as optical telescope apparatus, radio telescope apparatus, or antenna apparatus used in communication, radar, or the like. Further, the present disclosure is for apparatus including primary mirror including a metrology system. Herein, a case where the apparatus including primary mirror is a telescope apparatus is described.

With reference to FIGS. 1 to 4, a configuration of the telescope apparatus according to the first embodiment is described. The telescope apparatus thus illustrated is in a state where the primary mirror is oriented at an elevation angle of 88 degrees. FIGS. 1, 2, 3, and 4 are a schematic right side view, a schematic front view, a schematic rear view, and a schematic plan view of telescope apparatus 1, respectively. Telescope apparatus 1 includes a primary mirror portion 2, an elevation axis structural body 3, an azimuth mount 4, and a pedestal portion 5. Primary mirror portion 2 includes a primary mirror 6 and a primary mirror supporting portion 7 that supports primary mirror 6. Elevation axis structural body 3 is a member that supports primary mirror portion 2 and is rotatable around an elevation axis EL (also referred to as an EL axis or an elevation axis) that is a rotation axis that allows an elevation angle in an orientation direction to be changed. The orientation direction of telescope apparatus 1 is a direction in which primary mirror 6 (strictly speaking, a rotation axis RT of a paraboloid of revolution of a mirror surface) is oriented. Azimuth mount 4 supports elevation axis structural body 3 rotatably around elevation axis EL. Azimuth mount 4 is a member rotatable around an azimuth axis AZ (also referred to as an AZ axis or an azimuth axis) that is a rotation axis that allows an azimuth angle in the orientation direction to be changed. Pedestal portion 5 supports azimuth mount 4 rotatably around azimuth axis AZ. Pedestal portion 5 is fixed to a structure where telescope apparatus 1 is installed. The structure where telescope apparatus 1 is installed has a deep foundation in the ground. Primary mirror portion 2 and elevation axis structural body 3 each has a structure symmetrical with respect to a primary mirror center plane that is a plane including azimuth axis AZ and perpendicular to elevation axis EL.

In the drawings, elevation axis EL is indicated by a long dashed short dashed line. Azimuth axis AZ is indicated by a long dashed double-short dashed line. Rotation axis RT is indicated by a dashed line. Rotation axis RT is illustrated as a line segment between a secondary mirror and the primary mirror in FIGS. 1 and 4.

Primary mirror portion 2 includes primary mirror 6, primary mirror supporting portion 7, a secondary mirror 8, and a secondary mirror supporting portion 9. Primary mirror 6 reflects observation light. Primary mirror supporting portion 7 is provided on a rear surface of primary mirror 6 existing on the contrary side to the mirror surface to support primary mirror 6. Primary mirror supporting portion 7 is a structure in which rod-shaped members are joined together in a truss structure. Secondary mirror 8 is disposed at a focal point of primary mirror 6. Secondary mirror 8 further collects the observation light collected by primary mirror 6 and reflects the observation light in a direction in which elevation axis structural body 3 is provided. The observation light collected by secondary mirror 8 enters an observation optical system (not illustrated) and is sent to an observation device. An end of the observation optical system on a side existing primary mirror portion 2 is disposed at a position near rotation axis RT and a rear surface of primary mirror supporting portion 7. Secondary mirror supporting portion 9 supports secondary mirror 8. Secondary mirror supporting portion 9 includes three supporting columns each having a truss structure. Secondary mirror supporting portion 9 is provided at a peripheral portion of primary mirror supporting portion 7, which is located on an outer peripheral of primary mirror 6, so as to be symmetrical with respect to the primary mirror center plane. The center supporting column is provided such that a center of a connecting portion of the center supporting column is present on the primary mirror center plane.

Primary mirror 6 is a parabolic mirror whose mirror surface is a paraboloid of revolution. Telescope apparatus 1 is a so-called offset telescope. When primary mirror 6 is oriented in the zenith direction, rotation axis RT of the paraboloid of revolution is parallel to azimuth axis AZ, and rotation axis RT is provided at a position apart from azimuth axis AZ. Rotation axis RT and azimuth axis AZ are present on the primary mirror center plane. Elevation axis EL is perpendicular to the primary mirror center plane, and rotation axis RT and elevation axis EL are in mutually twisted positions. When either rotation axis RT or elevation axis EL is moved in parallel so as to cause rotation axis RT and elevation axis EL to be present on the same plane, rotation axis RT and elevation axis EL are orthogonal to each other. When primary mirror 6 is oriented in a direction other than the zenith direction, rotation axis RT and azimuth axis AZ intersect. The position of the intersection of rotation axis RT and azimuth axis AZ is always apart from the position of the intersection of elevation axis EL and azimuth axis AZ. The intersection of elevation axis EL and azimuth axis AZ is referred to as an orientation direction change center.

In the offset telescope, the mirror surface of primary mirror 2 has a shape obtained by cutting out a portion of a parabolic mirror into a circle. The mirror surface of primary mirror 6 having a circular outer shape is asymmetrical in cross section when cut by a plane passing through the center of the outer circle and parallel to rotation axis RT, except a case where the cutting plane is orthogonal to the primary mirror center plane. That is, in the offset telescope, the mirror surface is asymmetrical with respect to the center of the circular shape. On the other hand, a normal primary mirror is obtained by cutting out the mirror surface into a circle such that rotation axis RT of the paraboloid passes through the center. The normal primary mirror has the center of the circular shape that coincides with rotation axis RT. Therefore, the normal primary mirror has an axisymmetric mirror surface. In the normal primary mirror, a cross-sectional shape in cross section cut by a plane including rotation axis RT is symmetrical regardless of where the cutting plane is located. Telescope apparatus having the normal primary mirror is referred to as an axisymmetric telescope apparatus.

A heat insulating material is provided on a surface of primary mirror supporting portion 7 and a surface of secondary mirror supporting portion 9 so as to suppress deformation caused by temperature change. Further, primary mirror supporting portion 7 includes a structure for cooling a periphery of primary mirror supporting portion 7. The heat insulating material and the cooling structure are determined in consideration of an environment of a place where the telescope apparatus is installed.

In the offset telescope apparatus, regardless of in which direction primary mirror 6 is oriented, rotation axis RT is provided at a position apart from the orientation direction change center that is the intersection of azimuth axis AZ and elevation axis EL. Therefore, the end portion, on a side existing primary mirror portion 2, of the observation optical system disposed near rotation axis RT is located at a position apart from the orientation direction change center. The offset telescope apparatus has a high degree of freedom in use of a space between the orientation direction change center and the rear surface of primary mirror 6. In the axisymmetric telescope, since it is necessary to dispose the end portion, on the side existing primary mirror portion 2, of the observation optical system near the orientation direction change center, the degree of freedom in using the space between the orientation direction change center and the rear surface of primary mirror 6 is low.

Elevation axis structural body 3 includes two sets of bearing portions 10 and counterweight portions 11. The sets of bearing portions 10 and counterweight portions 11 are provided symmetrically on the rear surface of primary mirror supporting portion 7. Bearing portions 10 hold an elevation axis member 12 (illustrated in FIGS. 1 and 2) provided in azimuth mount 4 rotatably. Elevation axis member 12 and bearing portions 10 constitute elevation axis EL as a physical object. Counterweight portions 11 have such a weight that a center of gravity of primary mirror portion 2 and elevation axis structural body 3 are located near elevation axis EL. The center of gravity of primary mirror portion 2 and elevation axis structural body 3 are located on the primary mirror center plane. Counterweight portions 11 each has a shape like a fan having a center angle of about 135 degrees when viewed from the direction of elevation axis EL. Counterweight portions 11 are arranged at an interval of about 25% of a diameter of primary mirror 6 and in parallel to the primary mirror center plane.

Azimuth mount 4 includes elevation axis member 12, a mount base portion 13, an elevation axis structural body supporting portion 14, and a working scaffold 15. Mount base portion 13 is supported by pedestal portion 5. On an upper side of mount base portion 13, a motor, a gear mechanism, and the like for rotating elevation axis structural body 3 and keeping elevation axis structural body 3 at a specified angle are installed. The motor, the gear mechanism, and the like are not illustrated. Elevation axis structural body supporting portion 14 is a member that is provided on the upper side of mount base portion 13 and supports elevation axis structural body 3. Elevation axis structural body supporting portion 14 has, from its lower side, a cylindrical portion, a truncated cone portion, and an approximately cylindrical portion in a horizontal direction. The approximately cylindrical portion of elevation axis structural body supporting portion 14 has a truncated cone shape with a radius that decreases toward each end in the horizontal direction. Elevation axis member 12 is provided horizontally on each side surface of the approximately cylindrical portion. Elevation axis member 12 is a member constituting elevation axis EL. Elevation axis member 12 is a cylindrical member. Center axes of two elevation axis members 12 coincide with each other and coincide with elevation axis EL. Each elevation axis member 12 is disposed so as to be inserted into a corresponding bearing portion 10. Elevation axis members 12 are not visible when telescope apparatus 1 is viewed from the outside. Working scaffold 15 is a scaffold attached to mount base portion 13. A person stands on working scaffold 15 to perform work such as maintenance.

In telescope apparatus 1, elevation axis members 12 are provided in azimuth mount 4, and bearing portions 10 are provided in elevation axis structural body 3. The metrology system according to the present disclosure is also applicable to telescope apparatus in which elevation axis members 12 are provided in elevation axis structural body 3, and bearing portions 10 are provided in azimuth mount 4.

Pedestal portion 5 is fixed to the structure. Inside pedestal portion 5, a bearing portion that supports mount base portion 13 rotatably, a motor that rotates mount base portion 13, and the like are provided. The bearing portion is provided between mount base portion 13 and pedestal portion 5. The bearing portion includes a bearing that makes mount base portion 13 rotatable with less friction relative to pedestal portion 5.

Telescope apparatus 1 may or may not include a metrology system 30 that measures the amount of displacement of the structure of telescope apparatus 1. Telescope apparatus 1 can be corrected (compensate for) an error in the orientation direction and be scanned. As a method for correcting (compensating for) an error in the orientation direction, a known technique disclosed in PTL 2 or the like can be applied.

Figure 5:
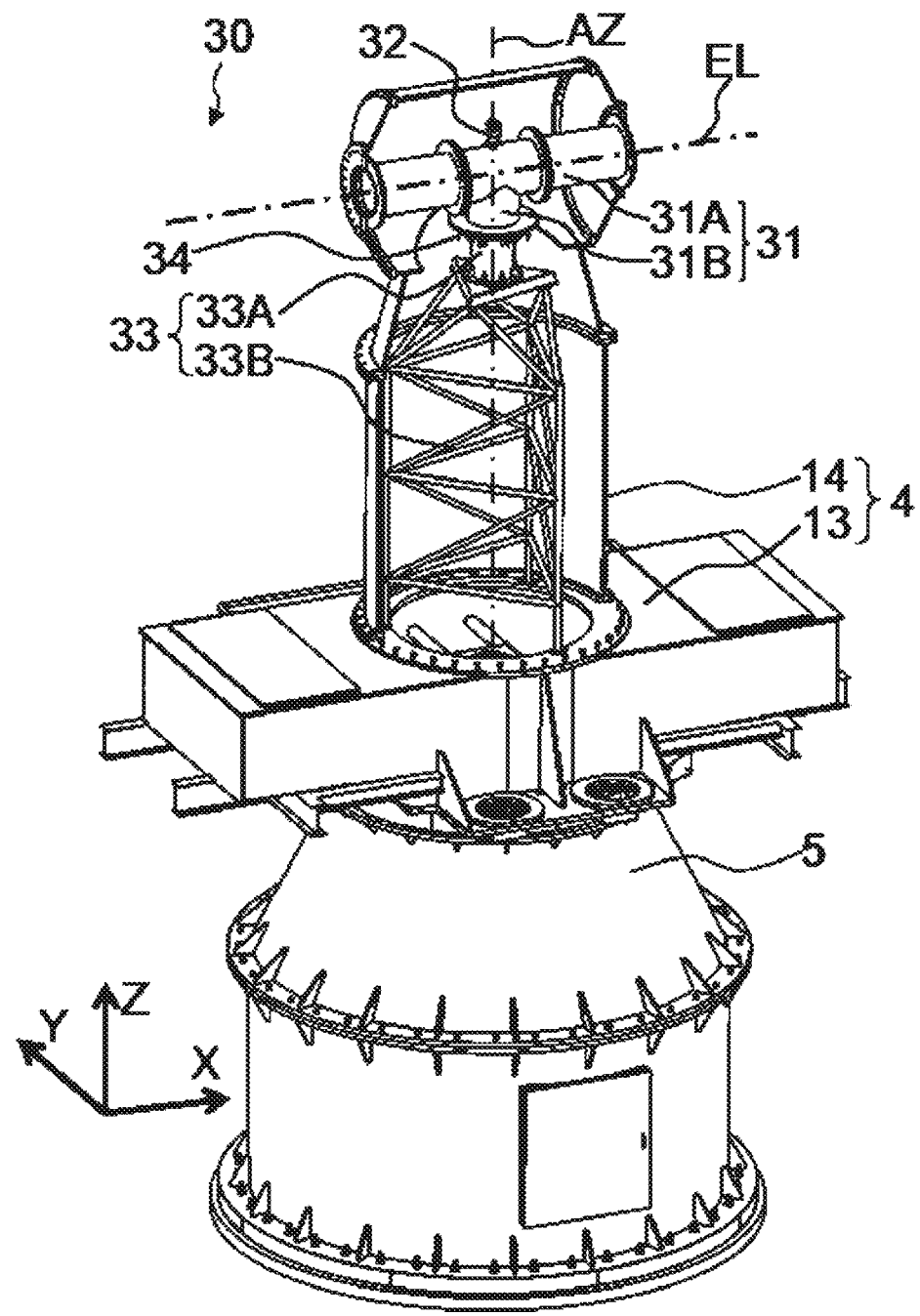
FIG. 5 is a perspective view (partial transparent perspective view) of a metrology system according to the first embodiment.
Figure 6:
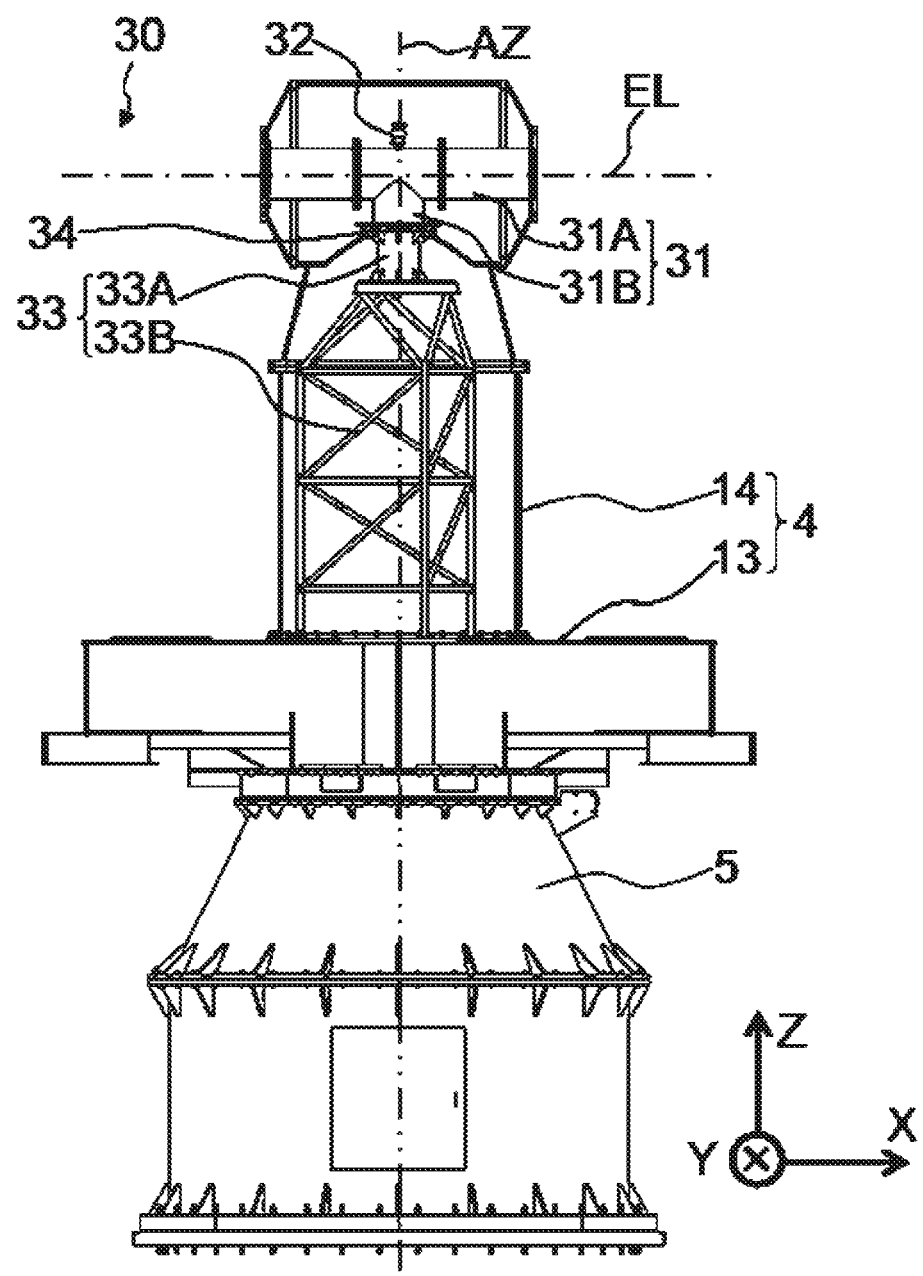
FIG. 6 is a front view (partial transparent perspective view) of the metrology system according to the first embodiment.
Figure 7:
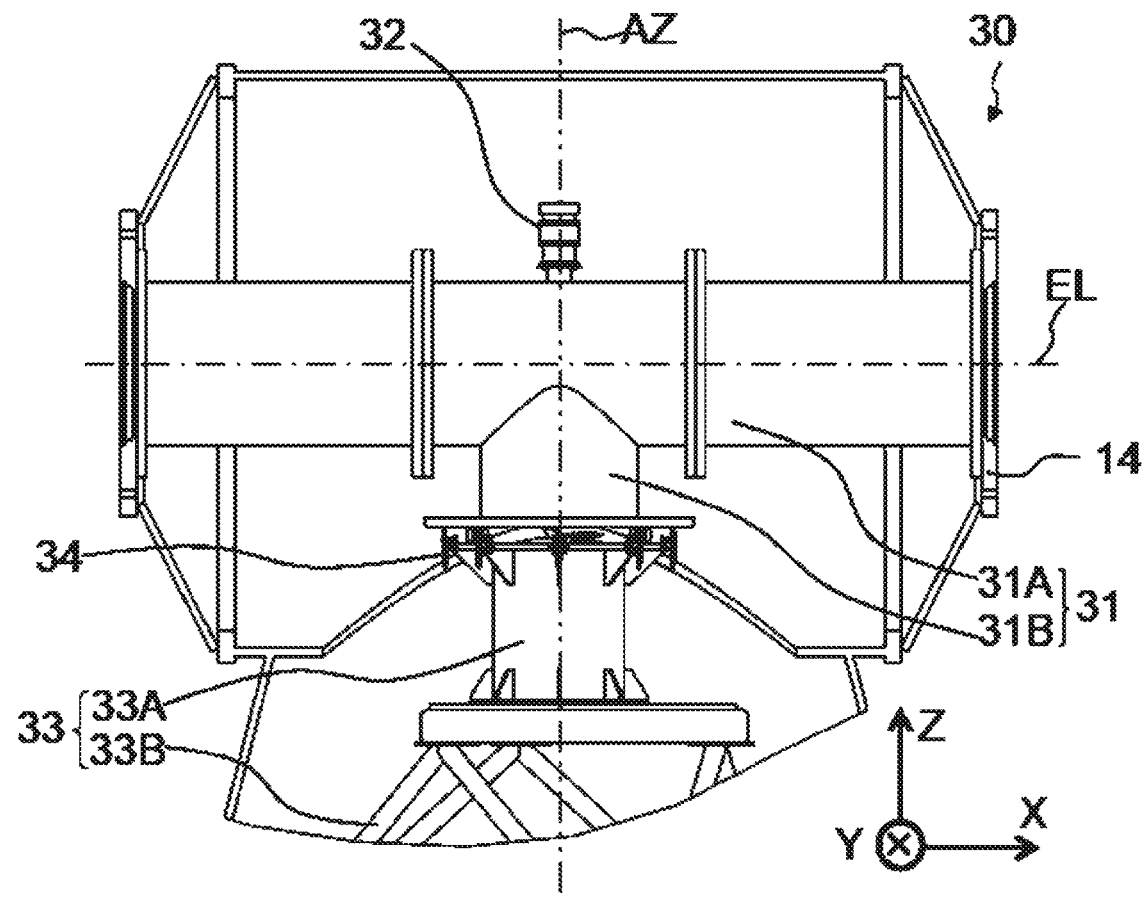
FIG. 7 is an enlarged front view of a portion including an elevation axis base portion included in the metrology system according to the first embodiment.
Figure 8:
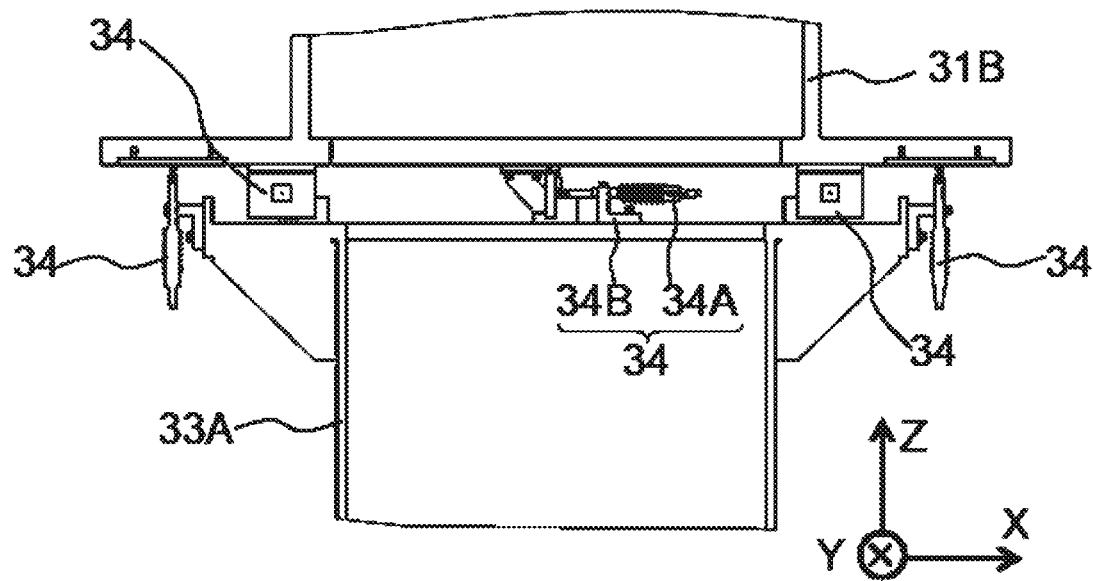
FIG. 8 is an enlarged front view of a portion of the metrology system according to the first embodiment where a displacement meter is disposed.
Figure 9:
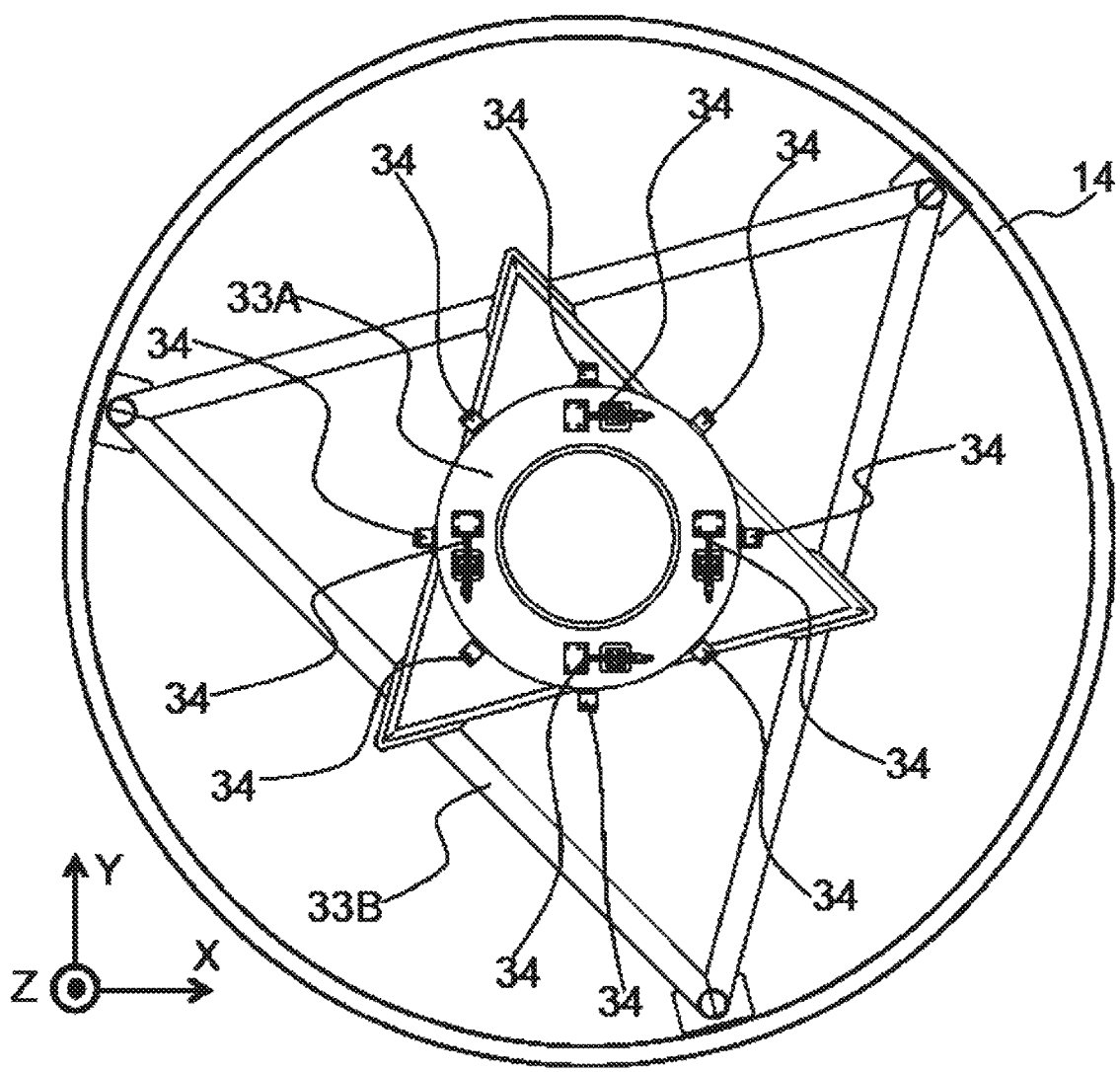
FIG. 9 is a plan view of the metrology system according to the first embodiment, illustrating a side where a mount base portion is provided as viewed from a virtual cross section.

With reference to FIGS. 5 to 9, a structure of metrology system 30 according to the first embodiment is described. Metrology system 30 is provided inside elevation axis structural body supporting portion 14. FIGS. 5 to 9 are drawn as if elevation axis structural body supporting portion 14 on a front side in a direction perpendicular to the paper surface does not exist. FIGS. 5 and 6 are a perspective view (partial transparent perspective view) and a front view (partial transparent perspective view) of metrology system 30, respectively. FIGS. 5 and 6 illustrate a state before working scaffold 15 is installed on mount base portion 13. FIG. 7 is an enlarged front view of a portion including the elevation axis base portion included in metrology system 30. FIG. 8 is an enlarged front view of a portion of metrology system 30 where a displacement meter is disposed. FIG. 9 is a plan view of metrology system 30. FIG. 9 is a plan view of a side where mount base portion 13 is provided as viewed from a virtual cross section of a lower side of a branch portion 31B.

To illustrate the structure and operation of metrology system 30, an XYZ coordinate system is defined as follows: A Z axis extending in a vertical direction is defined to coincide with azimuth axis AZ. An X axis is defined on a horizontal plane. A Y axis is defined to be orthogonal to the X axis on the horizontal plane. The Y axis is parallel to a direction in which primary mirror 6 is oriented at an elevation angle of zero degrees. A positive direction of the Y axis is a direction from a side where secondary mirror 8 is provided to a side where secondary mirror 8 is not provided. A positive direction of the X axis is a direction obtained by rotating the positive direction of the Y axis clockwise by 90 degrees.

Metrology system 30 includes an elevation axis base portion 31, an inclinometer 32, an azimuth axis base portion 33 and a displacement meter 34. Long-term monitoring of a change in the direction of elevation axis EL is performed using elevation axis base portion 31 and inclinometer 32. The change in the direction of elevation axis EL is caused by displacement due to heat generated in primary mirror portion 2, elevation axis structural body 3, and azimuth mount 4, displacement due to aging, or the like. Displacement meter 34 monitors displacement of elevation axis base portion 31 relative to azimuth axis base portion 33 in the short term. The short term means a short period of time as compared with a time required for monitoring displacement due to heat, displacement due to aging, or the like. The short term can also be said to be instantaneous. Elevation axis base portion 31, inclinometer 32, azimuth axis base portion 33, and displacement meter 34 are housed in azimuth mount 4.

Elevation axis base portion 31 include a main body portion 31A and branch portion 31B. Main body portion 31A is provided along the elevation axis, passing through a position where elevation axis EL and azimuth axis AZ intersect. Branch portion 31B extends downward from main body portion 31A. Main body portion 31A included in elevation axis base portion 31 have two ends fixed to elevation axis structural body supporting portion 14. Main body portion 31A is also referred to as a reference pole portion. Main body portion 31A has a shape in which three cylinders having the same radius and each having a flange are connected so that their center axes coincide with each other. Branch portion 31B that branches downward is connected to the center cylinder of main body portion 31A. Branch portion 31B extends along azimuth axis AZ. Branch portion 31B is a cylinder having a flange at its lower end. Branch portion 31B is provided so that its center axis coincides with azimuth axis AZ. Lower end of branch portion 31B is closed flat. A heat insulating material is attached to elevation axis base portion 31 as a measure against thermal expansion in order to reduce the amount of expansion or contraction caused by temperature change.

Inclinometer 32 is provided at a position on an upper side of elevation axis base portion 31 through which azimuth axis AZ passes. Inclinometer 32 measures an inclination angle of main body portion 31A that is a portion of elevation axis base portion 31 extending along elevation axis EL. Inclinometer 32 detects a direction of gravity and detects the inclination angle from a difference between the direction of gravity and a direction in which inclinometer 32 is installed.

Inclinometer 32 converts the displacement of elevation axis base portion 31 into an angle (inclination angle) of rotation around the X axis and an angle of rotation around the Y axis, and outputs the converted angles. Inclinometer 32 detects the amount of displacement ($\theta_X$, $\theta_Y$) of elevation axis base portion 31.

Inclinometer 32 is formed in elevation axis base portion 31 and is disposed on azimuth axis AZ. Elevation axis base portion 31 is provided along elevation axis EL. It is therefore possible to detect a deviation in the orientation direction of primary mirror 6. Since displacement due to heat or displacement due to aging occurs mainly on an axis other than the Z axis (azimuth axis AZ), inclinometer 32 that detects the amount of displacement ($\theta_X$, $\theta_Y$) of elevation axis base portion 31 can detect displacement due to heat or displacement due to aging.

When an inclinometer having an automatic reversal measurement function is used as inclinometer 32, it is possible to correct a temperature drift during long-term monitoring. Inclinometer 32 having the automatic reversal measurement function includes a turntable, and a sensor that detects the direction of gravity is installed on the turntable. By rotating the turntable by 180 degrees at intervals of fixed time and measuring the inclination angle, the effect of the temperature drift can be removed from the inclination angle.

Main body portion 31A (reference pole portion) of elevation axis base portion 31 is installed so as to represent the center axis of elevation axis EL. That is, elevation axis base portion 31 is fixed to elevation axis structural body supporting portion 14 so that the center axis of main body portion 31 having a cylindrical shape coincides with elevation axis EL. Therefore, inclinometer 32 can measure the amount of displacement of elevation axis EL. In a case where the center axis of main body portion 31 having a cylindrical shape is apart from elevation axis EL, the inclination angle measured by inclinometer 32 is different from the inclination angle of elevation axis EL.

Further, inclinometer 32 is installed at a position on an upper side of main body portion 31A through which azimuth axis AZ passes. Azimuth axis AZ is present at a center position of main body portion 31A in the horizontal direction. Therefore, inclinometer 32 can measure the amount of displacement of elevation axis EL caused by displacement of elevation axis structural body 3 and azimuth mount 4 (mainly, elevation axis structural body supporting portion 14) due to a load of primary mirror portion 2. When measuring the amount of displacement of elevation axis EL, inclinometer 32 can eliminate the influence of bending or local deformation of main body portion 31A included in elevation axis base portion 31. In a case where main body portion 31A included in elevation axis base portion 31 bends, when inclinometer 32 is installed at a position other than the center of main body portion 31A, inclinometer 32 also measures an inclination angle influenced by the bending of main body portion 31A in addition to the amount of displacement of elevation axis EL. Measuring the displacement including the inclination angle influenced by the bending means that inclinometer 32 cannot measure the amount of displacement of elevation axis EL accurately.

Inclinometer 32 is disposed at a position where the inclination of elevation axis EL can be measured as accurately as possible. As a result, the deviation of the orientation direction of telescope apparatus 1 can be corrected by exerting the maximum correction effect.

Azimuth axis base portion 33 has a lower end fixed to mount base portion 13. Azimuth axis base portion 33 is provided separately from elevation axis structural body supporting portion 14. Azimuth axis base portion 33 has an upper cylindrical portion 33A on its upper side and a frame structure portion 33B on its lower side. Upper cylindrical portion 33A is also referred to as a metrology pole. Frame structure portion 33B is also referred to as a metrology tower. The upper side of azimuth axis base portion 33 is a side adjacent to branch portion 31B. The lower side of azimuth axis base portion 33 is a side on which mount base portion 13 is provided. Upper cylindrical portion 33A is a cylinder having flanges at both ends. An upper flange of upper cylindrical portion 33A has a circular shape. A lower flange of upper cylindrical portion 33A has an equilateral triangular outer shape. A center of gravity of the equilateral triangle and a center axis of the cylinder of upper cylindrical portion 33A coincide with azimuth axis AZ. Upper and lower ends of upper cylindrical portion 33A are closed flat. A heat insulating material is attached to upper cylindrical portion 33A as a measure against thermal expansion in order to reduce the amount of expansion or contraction caused by temperature change. Frame structure portion 33B is a member having a frame structure in which rod-shaped members are connected.

Displacement meter 34 is provided between branch portion 31B and upper cylindrical portion 33A. Displacement meter 34 measures the amount of displacement of branch portion 31B relative to upper cylindrical portion 33A. Displacement meter 34 is preferably an optical encoder as disclosed in PTL 3. A rotary encoder and a linear encoder of other types such as a mechanical type, a magnetic type, or an electromagnetic induction types can be used. Rather than measuring the amount of one-dimensional displacement, a displacement meter that measures the amount of two-dimensional or three-dimensional displacement may be used.

Frame structure portion 33B has an equilateral triangular outer shape as viewed from above as illustrated in FIG. 9. The three vertices of the triangle of frame structure portion 33B are arranged immediately inside the circular cross section of elevation axis structural body supporting portion 14. The three sides of the triangle of frame structure portion 33B are arranged at angles of 15 degrees, 75 degrees, and 135 degrees relative to the positive direction of the X axis. As illustrated in FIG. 6, frame structure portion 33B includes three rod members fixed vertically to mount base portion 13 at positions of the vertexes of the triangle. The three vertical rod members are connected by three rod members provided horizontally at different height positions. There are three sets of three horizontal rod members. Frame structure portion 33B further includes three rod members extending obliquely to connect joint portions between the vertical rod members and the horizontal rod members. Six rod members extend obliquely from the horizontal rod members at the highest position to connect to the vertices of the triangle at the lower end of upper cylindrical portion 33A. Frame structure portion 33B has the rod members connected to form triangles, so that it is possible to make the frame structure portion 33B lightweight and strong. The structure in which upper cylindrical portion 33A and frame structure portion 33B are combined enables a reduction in weight of azimuth axis base portion 33 as compared with a case where azimuth axis base portion 33 has a cylindrical structure in its entirety.

With reference to FIGS. 7 to 9, the layout and structure of displacement meter 34 are described. As illustrated in an enlarged view of a main portion in FIG. 7, between branch portion 31B and upper cylindrical portion 33A, displacement meters 34 are disposed in parallel to the Z direction and displacement meters 34 are disposed in parallel to the horizontal plane. Displacement meter 34 is a linear encoder that measures the amount of one-dimensional displacement. The linear encoder measures the amount of displacement of one object relative to the other object. In order for the linear encoder to measure the amount of displacement, one object is provided with a scale with divisions, and the other object is provided with a sensor that reads the divisions on the scale. The linear encoder measures the amount of displacement between one object and the other object by reading the divisions on the scale with the sensor.

As illustrated in FIG. 8, displacement meter 34 includes a scale member 34A and a sensor portion 34B. Scale member 34A has a scale that is a rod-shaped member with divisions. Sensor portion 34B includes a ring-shaped member into which the rod-shaped member is inserted, and a sensor that reads the divisions on the rod-shaped member. In the drawing, the sensor is represented by a circle below the rod-shaped member. When the rod-shaped member is inserted into the ring-shaped member, the rod-shaped member moves only in a determined direction. In metrology system 30, scale member 34A is attached to branch portion 31B, and sensor portion 34B is attached to upper cylindrical portion 33A. Alternatively, scale member 34A may be attached to upper cylindrical portion 33A, and sensor portion 34B may be attached to branch portion 31B. For each displacement meter 34, member to which scale member 34A is attached may be different, and member to which sensor portion 34B is attached may be different.

As illustrated in FIGS. 8 and 9, metrology system 30 includes four displacement meters 34 having rod-shaped members arranged in a horizontal direction (perpendicular to the Z axis) and eight displacement meters 34 having rod-shaped members arranged in a vertical direction (parallel to the Z axis). Displacement meters 34 having rod-shaped members arranged in the horizontal direction are referred to as horizontally arranged displacement meter 34. Displacement meters 34 having rod-shaped member arranged in the vertical direction are referred to as vertically arranged displacement meters 34. Four horizontally arranged displacement meters 34 are arranged on an upper surface of upper cylindrical portion 33A, two of four horizontally arranged displacement meters 34 extending in the X-axis direction, and the other two extending in the Y-axis direction. Eight vertically arranged displacement meters 34 each has sensor portion 34B attached to a side surface of a corresponding one of eight ribs provided on the flange at the upper end of upper cylindrical portion 33A. The eight ribs are provided at intervals of 45 degrees in the horizontal plane. Straight lines connecting two ribs facing each other include a straight line parallel to the X axis or the Y axis.

From the amount of displacement measured by displacement meter 34, the amount of displacement of branch portion 31B along the X axis, the Y axis, and the Z axis relative to upper cylindrical portion 33A is calculated. The amount of displacement of branch portion 31B relative to upper cylindrical portion 33A is calculated by considering the amount of displacement generated by translational motion of a center of gravity $G_0$ of branch portion 31B ($\delta_X$, $\delta_Y$, $\delta_Z$) and the amount of displacement generated by rotational motion around center of gravity $G_0$ ($\theta_X$, $\theta_Y$, $\theta_Z$). For each displacement meter $34_j$, the amount of displacement ($\delta_X$, $\delta_Y$, $\delta_Z$) generated by translational motion and the amount of displacement ($\theta_X$, $\theta_Y$, $\theta_Z$) generated by rotational motion around center of gravity $G_0$ are calculated from an amount of displacement $\Delta_j$ measured by each displacement meter $34_j$ by considering a direction vector used for measuring the amount of displacement and a position vector of each displacement meter 34 relative to center of gravity $G_0$. The amount of displacement that affects a change in the orientation direction of telescope apparatus 1 greatly is the amount of displacement ($\theta_X$, $\theta_Y$, $\theta_Z$) generated by rotational motion. Displacement meter 34 detects the amount of rotational displacement ($\theta_X$, $\theta_Y$, $\theta_Z$) of elevation avis base portion 31 including branch portion 31B.

The amount of displacement $\Delta_j$ measured by horizontally arranged displacement meters 34 is generated mainly as an amount of displacement (0, 0, $\theta_Z$) generated by rotational motion around the Z axis and amounts of displacement ($\delta_X$, $\delta_Y$, 0) generated by translational motion on the XY plane. The amount of displacement $\Delta_j$ measured by vertically arranged displacement meters 34 is generated mainly as amounts of displacement ($\theta_X$, $\theta_Y$, 0) generated by rotational motion around the X axis and the Y axis and an amount of displacement (0, 0, $\theta_Z$) generated by translational motion in the Z-axis direction. Depending on the direction in which displacement meter 34 is installed, which of the amounts of displacement generated by rotational motion around the X axis and the Y axis is measured mainly by displacement meter 34 is changed.

Displacement meter 34 detects the amount of displacement of elevation axis base portion 31 including branch portion 31B relative to azimuth axis base portion 33 including upper cylindrical portion 33A. Azimuth axis base portion 33 is fixed firmly to mount base portion 13, and mount base portion 13 and pedestal portion 5 are fixed firmly to the structure. Therefore, displacement meter 34 can measure the amount of displacement of elevation axis EL that is generated when primary mirror portion 2, elevation axis structural body 3, and azimuth mount 4 are deformed temporarily by wind (wind pressure) or the like. Displacement meter 34 can detect an amount of temporary rotational displacement ($\theta_X$, $\theta_Y$, $\theta_Z$) of elevation axis base portion 31 caused by wind (wind pressure) or the like. Since displacement meter 34 is installed on a side of branch portion 31B adjacent to azimuth axis base portion 33, and elevation axis base portion 31 is provided along elevation axis EL, a deviation in the orientation direction of telescope apparatus 1 can be detected from the rotational amount of displacement ($\theta_X$, $\theta_Y$, $\theta_Z$) of elevation axis base portion 31.

Azimuth mount 4 and pedestal portion 5 are fixed firmly to the ground where telescope apparatus 1 is installed. Further, azimuth axis base portion 33 is fixed firmly to mount base portion 13 included in azimuth mount 4. Azimuth axis base portion 33 is fixed to mount base portion 13 separately from elevation axis structural body supporting portion 14. Therefore, the position of azimuth axis base portion 33 relative to the ground is fixed. Further, elevation axis structural body supporting portion 14 houses azimuth axis base portion 33 therein, but elevation axis structural body supporting portion 14 and azimuth axis base portion 33 are not connected. Therefore, azimuth axis base portion 33 is not affected by displacement or deformation of elevation axis structural body supporting portion 14. On the other hand, elevation axis base portion 31 is fixed to elevation axis structural body supporting portion 14. Displacement meter 34 is installed between azimuth axis base portion 33 and elevation axis base portion 31. Therefore, displacement meter 34 can measure the amount of displacement of elevation axis structural body supporting portion 14 relative to the ground.

Elevation axis base portion 31, inclinometer 32, azimuth axis base portion 33, and displacement meter 34 are housed in azimuth mount 4. That is, azimuth mount 4 is a cover (casing) of elevation axis base portion 31, inclinometer 32, azimuth axis base portion 33, and displacement meter 34. Therefore, the measurement accuracy of inclinometer 32 and displacement meter 34 can be maintained high. A disturbance caused by wind or the like is not applied directly to elevation axis base portion 31 and azimuth axis base portion 33. Therefore, the amount of displacement of elevation axis EL corresponds to the amount of displacement of elevation axis base portion 31. Further, inclinometer 32 and displacement meter 34 are disposed in an environment with less temperature fluctuation. Therefore, in the amount of displacement measured by inclinometer 32 and displacement meter 34, an error resulting from temperature change or the like is reduced.

Inclinometer 32 is used in long-term monitoring of displacement due to heat, displacement due to aging, or the like, and any inclinometer 32 longer in sampling period than displacement meter 34 may be used. On the other hand, displacement meter 34 is used in short-term monitoring of displacement caused by wind (wind pressure) or the like. Therefore, a sampling period of displacement meter 34 is shorter than a sampling period of inclinometer 32.

The metrology system and the telescope apparatus according to the first embodiment can detect a deviation in the orientation direction of primary mirror 6 by measuring the amount of displacement of elevation axis base portion 31. For example, the use of the method disclosed in PTL 2 in processing displacement that is measured by displacement meter 34 and fluctuates in the short term allows the telescope to be oriented in an intended direction even in a case where there is displacement that fluctuates in the short term. Further, it is possible to grasp an error between a command value for the orientation direction and a direction in which the primary mirror is oriented actually by processing a long-term fluctuation measured by inclinometer 32 and to orient the primary mirror in the commanded orientation direction even in a telescope having an error in the orientation direction caused by the displacement due to aging or the like.

Inclinometer 32 may be disposed on azimuth axis AZ between the orientation direction change center, which is the intersection of azimuth axis AZ and elevation axis EL, and the rear surface of primary mirror 6. Offset telescope apparatus 1 has a sufficient space between elevation axis base portion 31 and the rear surface of primary mirror 6, so that inclinometer 32 is disposed easily. Also in an axisymmetric telescope apparatus, the inclinometer is disposed in the space between the elevation axis base portion and the rear surface of the primary mirror.

Since upper cylindrical portion 33A included in azimuth axis base portion 33 and elevation axis base portion 31 have a cylindrical shape, upper cylindrical portion 33A and elevation axis base portion 31 have no direction dependency in deformation such as expansion or contraction caused by temperature change. This prevent upper cylindrical portion 33A and elevation axis base portion 31 from being deformed locally, and allows inclinometer 32 and displacement meter 34 to measure the amount of displacement of elevation axis EL accurately.

It is possible to monitor displacement due to heat, displacement due to aging, or the like over the long term using displacement meter 34 instead of inclinometer 32. For this purpose, the followings are required. (a) Azimuth axis base portion 33 is fixed to a foundation separated from telescope apparatus 1. (b) Elevation axis base portion 31 and azimuth axis base portion 33 are made of a material having a low thermal expansion coefficient, such as an invar alloy. Inclinometer 32 measures the direction of gravity, so that no matter where inclinometer 32 is installed, inclinometer 32 can measure the inclination angle of a member on which inclinometer 32 is installed. Therefore, the above-described measures necessary for the long-term monitoring of displacement due to heat, displacement due to aging, or the like by displacement meter 34 are not required.

The metrology system may include only inclinometer 32 without displacement meter 34. In such a metrology system without displacement meter 34, the elevation axis base portion does not have branch portion 31B. The elevation axis base portion is provided along the elevation axis, and passes through a position where elevation axis EL and azimuth axis AZ intersect. The metrology system including only inclinometer 32 can measure long-term displacement of elevation axis EL and correct an error in the orientation direction of the telescope apparatus caused by the displacement due to aging or the like. Regardless of whether displacement meter 34 is provided, the metrology system including inclinometer 32 is applicable to telescope apparatus in which the elevation axis base portion can be disposed at a position along elevation axis EL.

Instead of displacement meter 34 that measures the plurality of amounts of one-dimensional displacement, a displacement meter capable of measuring the amount of two-dimensional or three-dimensional displacement may be used. The use of the displacement meter capable of measuring the amount of two-dimensional or three-dimensional displacement allows a reduction in the number of displacement measuring components. The displacement meter capable of measuring the amount of two-dimensional or three-dimensional displacement is disposed appropriately considering the amount of displacement to be measured.

Herein, a case where the metrology system according to the present disclosure is applied to telescope apparatus has been described. The metrology system according to the present disclosure is applicable to not only telescope apparatus but also apparatus including primary mirror that includes a primary mirror portion including a primary mirror and a primary mirror supporting portion that supports the primary mirror, an elevation axis structural body that supports the primary mirror portion, and being rotatable around an elevation axis that allows an elevation angle in an orientation direction in which the primary mirror is oriented to be changed, an azimuth mount being rotatable around an azimuth axis that allows an azimuth angle in the orientation direction to be changed, and to support the elevation axis structural body rotatably around the elevation axis, and a pedestal portion that supports the azimuth mount rotatably around the azimuth axis. The metrology system according to the present disclosure is capable of measuring the amount of displacement of a structure of the apparatus including primary mirror, particularly the amount of displacement of the elevation axis. Examples of the apparatus including primary mirror may include an antenna apparatus and the like.

A modification of the embodiment, omission of some components, or any desired combination of a modification and omission is possible.

REFERENCE SIGNS LIST

1: telescope apparatus (apparatus including primary mirror),
2: primary mirror portion,
3: elevation axis structural body,
4: azimuth mount,
5: pedestal portion,
6: primary mirror,
7: primary mirror supporting portion,
8: secondary mirror,
9: secondary mirror supporting portion,
10: bearing portion,
11: counterweight portion,
12: elevation axis member,
13: mount base portion,
14: elevation axis structural body supporting portion,
15: working scaffold,
30: metrology system,
31: elevation axis base portion,
31A: main body portion (reference pole portion),
31B: branch portion,
32: inclinometer,
33: azimuth axis base portion,
33A: upper cylindrical portion (metrology pole),
33B: frame structure portion (metrology tower),
34: displacement meter,
34A: scale member,
34B: sensor portion

The invention claimed is:

1. A metrology system for measuring an amount of displacement of a structure of an apparatus including a primary mirror, the apparatus including the primary mirror including a primary mirror portion including the primary mirror and a primary mirror supporting portion to support the primary mirror, an elevation axis structural body to support the primary mirror portion, and being rotatable around an elevation axis that allows an elevation angle in an orientation direction in which the primary mirror is oriented to be changed, an azimuth mount to support the elevation axis structural body rotatably around the elevation axis, and being rotatable around an azimuth axis that allows an azimuth angle in the orientation direction to be changed, and a pedestal portion to support the azimuth mount rotatably around the azimuth axis, the metrology system comprising:
   an elevation axis base portion provided along the elevation axis, passing through a position where the elevation axis and the azimuth axis intersect, and being fixed to the azimuth mount; and
   an inclinometer disposed at a position of the elevation axis base portion through which the azimuth axis passes, and to measure an inclination angle of the elevation axis base portion.

2. The metrology system according to claim 1, wherein a portion of the elevation axis base portion extending along the elevation axis has a cylindrical shape, and a center axis of a cylinder of the elevation axis base portion coincides with the elevation axis.

3. The metrology system according to claim 1, wherein the azimuth mount includes a mount base portion supported by the pedestal portion, and an elevation axis structural body supporting portion provided on an upper side of the mount base portion to support the elevation axis structural body, and to which the elevation axis base portion is fixed, and
   the elevation axis base portion includes a main body portion extending along the elevation axis and a branch portion extending downward from the main body portion, the metrology system further comprising:
   an azimuth axis base portion provided separately from the elevation axis structural body supporting portion and having a lower end fixed to the mount base portion; and
   a displacement meter provided between the branch portion and the azimuth axis base portion to measure an amount of displacement of the branch portion relative to the azimuth axis base portion.

4. The metrology system according to claim 3, wherein the main body portion and the branch portion each have a cylindrical shape,
   the azimuth axis base portion includes an upper cylindrical portion having a cylindrical shape on a side adjacent to the branch portion,
   a center axis of a cylinder of the main body portion coincides with the elevation axis,
   a center axis of a cylinder of the branch portion coincides with the azimuth axis, and
   a center axis of the upper cylindrical portion coincides with the azimuth axis.

5. The metrology system according to claim 3, wherein the elevation axis base portion, the azimuth axis base portion, the inclinometer, and the displacement meter are housed in the azimuth mount.

6. The metrology system according to claim 3, wherein the displacement meter measures an amount of displacement of the branch portion relative to a Z axis parallel to the azimuth axis, an X axis orthogonal to the Z axis, and a Y axis orthogonal to the X axis and the Z axis.

7. The metrology system according to claim 3, wherein a sampling period of the displacement meter is shorter than a sampling period of the inclinometer.

8. The metrology system according to claim 3, wherein the azimuth axis base portion includes, on a side where the mount base portion exists, a frame structure portion in which rod-shaped members are connected.

9. Apparatus including primary mirror comprising:
the metrology system according to claim 1;
the primary mirror portion;
the elevation axis structural body;
the azimuth mount; and
the pedestal portion.

10. The apparatus including primary mirror according to claim 9, wherein
the primary mirror portion further includes a secondary mirror disposed at a focal point of the primary mirror, and a secondary mirror supporting portion to support the secondary mirror.

11. The apparatus including primary mirror according to claim 10, wherein
the primary mirror is a parabolic mirror that is a paraboloid of revolution, and a rotation axis of the paraboloid of revolution, and the elevation axis are in mutually twisted positions.

12. An apparatus including a primary mirror, the apparatus comprising:
a primary mirror portion including the primary mirror and a primary mirror supporting portion to support the primary mirror, the primary mirror being a parabolic mirror having a paraboloid of revolution, a rotation axis of the paraboloid of revolution being in a twisted position relative to an elevation axis that allows an elevation angle in an orientation direction to be changed;
an elevation axis structural body to support the primary mirror portion, and being rotatable around the elevation axis;
an azimuth mount to support the elevation axis structural body rotatably around the elevation axis, and being rotatable around an azimuth axis that allows an azimuth angle in the orientation direction to be changed;
a pedestal portion to support the azimuth mount rotatably around the azimuth axis;
an elevation axis base portion provided along the elevation axis, passing through a position where the elevation axis and the azimuth axis intersect, and being fixed to the azimuth mount; and
an inclinometer disposed at a position of the elevation axis base portion through which the azimuth axis passes, and to measure an inclination angle of the elevation axis base portion.

13. The apparatus including primary mirror according to claim 12, wherein
a portion of the elevation axis base portion extending along the elevation axis has a cylindrical shape, and a center axis of a cylinder of the elevation axis base portion coincides with the elevation axis.

14. The apparatus including primary mirror according to claim 12, wherein
the azimuth mount includes a mount base portion supported by the pedestal portion, and an elevation axis structural body supporting portion provided on an upper side of the mount base portion to support the elevation axis structural body, and to which the elevation axis base portion is fixed,
the elevation axis base portion includes a main body portion extending along the elevation axis and a branch portion extending downward from the main body portion, and
the apparatus including primary mirror further comprising:
an azimuth axis base portion provided separately from the elevation axis structural body supporting portion and having a lower end fixed to the mount base portion; and
a displacement meter provided between the branch portion and the azimuth axis base portion to measure an amount of displacement of the branch portion relative to the azimuth axis base portion.

15. The apparatus including primary mirror according to claim 14, wherein
the main body portion and the branch portion each have a cylindrical shape,
the azimuth axis base portion includes an upper cylindrical portion having a cylindrical shape on a side adjacent to the branch portion,
a center axis of a cylinder of the main body portion coincides with the elevation axis,
a center axis of a cylinder of the branch portion coincides with the azimuth axis, and
a center axis of the upper cylindrical portion coincides with the azimuth axis.

16. The apparatus including primary mirror according to claim 14, wherein
the elevation axis base portion, the azimuth axis base portion, the inclinometer, and the displacement meter are housed in the azimuth mount.

17. The apparatus including primary mirror according to claim 14, wherein
the displacement meter measures an amount of displacement of the branch portion relative to a Z axis parallel to the azimuth axis, an X axis orthogonal to the Z axis, and a Y axis orthogonal to the X axis and the Z axis.

18. The apparatus including primary mirror according to claim 14, wherein
a sampling period of the displacement meter is shorter than a sampling period of the inclinometer.

19. The apparatus including primary mirror according to claim 14, wherein
the azimuth axis base portion includes, on a side where the mount base portion exists, a frame structure portion in which rod-shaped members are connected.

20. The apparatus including primary mirror according to claim 14, wherein
the primary mirror portion further includes a secondary mirror disposed at a focal point of the primary mirror, and a secondary mirror supporting portion to support the secondary mirror.

* * * * *